(12) United States Patent
Salls

(10) Patent No.: US 6,472,768 B1
(45) Date of Patent: Oct. 29, 2002

(54) HYDROKINETIC GENERATOR

(76) Inventor: Darwin Aldis Salls, P.O. Box 770126, Ocala, FL (US) 34477-0126

( * ) Notice: Subject to any disclaimer, the term of this patent is extended or adjusted under 35 U.S.C. 154(b) by 93 days.

(21) Appl. No.: 09/670,296

(22) Filed: Sep. 26, 2000

(51) Int. Cl.[7] ............................................. F03B 11/02
(52) U.S. Cl. .............................. 290/54; 405/75; 415/2.1
(58) Field of Search .............................. 290/42, 43, 52, 290/53, 54; 405/75; 415/2.1; 416/119

(56) References Cited

U.S. PATENT DOCUMENTS

| | | | | |
|---|---|---|---|---|
| 3,986,787 A | * | 10/1976 | Mouton et al. | 290/54 |
| 4,468,153 A | * | 8/1984 | Gutierrez Atencio | 290/52 |
| 4,526,494 A | * | 7/1985 | Eicher | 119/219 |
| 4,697,984 A | * | 10/1987 | Takeuchi et al. | 248/618 |
| 5,440,176 A | * | 8/1995 | Haining | 290/42 |
| 6,109,863 A | * | 8/2000 | Milliken | 415/1 |
| 6,114,773 A | * | 9/2000 | Kouris | 290/52 |

* cited by examiner

Primary Examiner—Nicholas Ponomarenko

(57) ABSTRACT

An improved method and means for transforming kinetic energy into mechanical energy to generate hydroelectric power. A submersible scoop-like composite structure (10) with a hollow, tapered, inner chamber to funnel moving water through a turbine (22). The structure (10) has a hydrodynamically clean outer hull with cambered surfaces to increase the velocity of moving water to enhance the turbine's (22) efficiency. The structure (10) has a large orifice with a protective grill (14). The body of the structure (10) contains a vertical stabilizer petition (13) to keep the structure (10) parallel with the direction of the moving water. The detachable turbine (22) is housed in a tube (11) attached aft of the structure (10). The detachable generator (25A, 25B, 25C) is housed in a protective housing (12A, 12B, 12C) and attached to the turbine housing (11). The turbine (22) is coupled to the generator (25A, 25B, 25C) by a turbine drive shaft (24) through a gear box (23) to a generator drive shaft (26A, 26B, 26C). The turbine drive shaft (24) is supported by a front vertical support (27) and a rear vertical support (28). The generator drive shaft (26A, 26B, 26C) is protected by a generator drive shaft housing (29A, 29B, 29C). The entire structure is attached to an anchor base (16A, 16B, 18A, 18B, 21) by legs (15A, 15B, 17A, 19A, 19B, 20) The anchor base is fixed to a submerged medium. The scoop-like composite structure is formed from rigid material and submerged, whereby it cannot be seen from the surface. The structure is cost effective, efficient, produces no known pollution, and is not susceptible to weather related damage.

5 Claims, 8 Drawing Sheets

HYDROKINETIC GENERATOR

STATEMENT REGARDING FEDERALLY SPONSORED RESEARCH OR DEVELOPMENT

Applicant has not received or applied for any assistance from any federal institution for research or development.

REFERENCE TO A MICROFICHE APPENDIX

Applicant does not have a microfiche appendix.

BACKGROUND OF THE INVENTION

1. Field of Invention

Applicant's Hydrokinetic Generator relates to an improved method and means for transformation of kinetic energy into mechanical energy, in which to generate hydroelectric power. Specifically, by manipulating naturally moving water current over and through a structure which is hydro-dynamically clean in design to increase water current velocity to rotate a typical turbine effectively and efficiently, thereby avoiding the expensive construction of dams and reservoirs that power present hydroelectric plants.

2. Description of Related Art

There are many structures designed to produce power from moving water. From the vertical rotating water wheel dating back over two thousand years, to the newer efficient water wheels called hydraulic turbines. Most of these turbines are driven by water from water falls, or water stored behind dams and reservoirs. The three main types of water turbines are: (a) The Pelton Wheel, which is an impluse turbine consisting of a single wheel mounted on a horizontal axle. The wheel has cup-shaped buckets around its perimeter. Water is channeled from a reservoir through a long pipe that increases the water velocity aimed at the buckets. The high water speed jets water against the buckets, turns the wheel; (b) The Frances Turbine, which has a rotor enclosed in a casing. Its wheel has many curved blades on a vertical axle and operates under water. The turbine is rotated chiefly by the weight or pressure of water from a dam or reservoir; (c) The Kaplan Turbine, which its turbine rotor blades resemble a ship's propeller and works similar to the Frances Turbine.

There are water turbines that are designed to be submerged in rivers where the normal flow of water provides power, however, the power produced is limited by the speed of the river's flow. Other designs use the incoming and outgoing tides to rotate water wheels, however, their mechanical power is not continuous and is dependent upon the tides.

None of the mentioned turbines use the same principle as Applicant's Hydrokinetic Generator, where natural water currents are manipulated through and over a hollow hydrodynamically clean scoop-like structure with a large orifice and a funnel-shaped body, which increases the water pressure inside to rotate the turbine, and at the same time, the outer symmetrical hull provides a surface which acts like a hydrofoil and increases the water velocity as it moves over the cambered outer surfaces and rushes to fill the void. The turbine rotates a shaft that powers a generator. This eliminates the costly construction of reservoirs and dams that provide water pressure to power present hydroelectric turbine systems.

BRIEF SUMMARY OF THE INVENTION

A method and means for building and operating a scoop-like hydrodynamically clean tapered structure for an improved method for producing electrical power by converting kinetic energy into mechanical energy to power one or more generators. Applicant's Hydrokinetic Generator comprises: a hollow rigid scoop-like tapered structure in which to channel moving water through a large orifice, through a tapered funnel-shaped sluice, and out through one or more smaller tubes containing one or more turbines. The hollow rigid structure having a hydrodynamically clean symmetrical outer hull allows the natural water current to flow over the symmetrical cambers on the top, the sides, and the bottom surfaces of the scoop-like hull, at a greater velocity than the natural current flow, thus creating maximum water flow velocity that merge with the flow from the smaller opening which houses the turbine. This increased outer hull water velocity allows higher water velocity as it exits the scoop-like structure and increases the efficiency of the turbine.

The reinforced rigid hull has chambers between the outer hull and the inner hull which allows the scoop-like structure to be transported at a lighter weight. These chambers are flooded when the scoop-like structure is set in place. The large orifice of the scoop-like structure is protected by a grill to inhibit debris, foreign objects, and large sea life, from entering the large orifice of the structure. The grill ribs are elliptically shaped and produce virtually no drag effect on the water current flow into the structure.

The turbine and housing is detachable from the scoop-like composite hull. The generator housings are also detachable from the turbine housing and composite hull, to allow maintenance without having to move the entire structure.

Further objects and advantages of Applicant's Hydrokinetic Generator will become apparent from a consideration of the drawings and ensuing description.

OBJECTS AND ADVANTAGES

1. The composite scoop-like structure is economically feasible because of the ease and simplicity of modular construction, unlike the construction of monstrous dams and reserviors for hydroelectric power plants in which construction costs alone can reach into the billions of dollars.

2. The scoop-like composite structure is portable and ideal for coastal, or island communities close to ocean currents, and communities close to rivers and streams.

3. The scoop-like composite structure is submerged and cannot be seen from the water's surface.

4. The scoop-like composite structure produces no known pollution.

5. The scoop-like composite structure is not as susceptible to weather related damage, as conventional electrical power generating plants.

DRAWINGS

LIST OF REFERENCE NUMBERS

10—is a scoop-like composite structure hull.
10A—is a left top floodable chamber.

10B—is a right top floodable chamber.
10C—is a left bottom floodable chamber.
10D—is a right bottom floodable chamber.
10E—is a left side floodable chamber.
10F—is a right side floodable chamber.
11—is a detachable turbine housing.
12A—is a left detachable generator housing.
12B—is a right detachable generator housing.
12C—is a top detachable generator housing.
13—is a vertical stabilizer petition.
14—is a grill.
15A—is a left front leg.
15B—is a right front leg.
16A—is a left floodable anchor base.
16B—is a right floodable anchor base.
17A—is a left rear leg.
17B—is a right rear leg. (not shown)
18A—is a left front floodable anchor base.
18B—is a right front floodable anchor base.
19A—is a left front leg.
19B—is a right front leg.
20—is a rear leg.
21—is a rear floodable anchor base.
22—is a turbine.
23—is a gear box.
24—is a turbine drive shaft.
25A—is a left detachable generator.
25B—is a right detachable generator.
25C—is a top detachable generator.
26A—is a left generator drive shaft.
26B—is a right generator drive shaft.
26C—is a top generator drive shaft.
27—is a front vertical turbine drive shaft support.
28—is a rear vertical turbine drive shaft support.
29A—is a left horizontal generator drive shaft housing.
29B—is a right horizontal generator drive shaft housing.
29C—is a top vertical generator drive shaft housing.

DETAILED DESCRIPTION OF THE INVENTION

Figure 1:
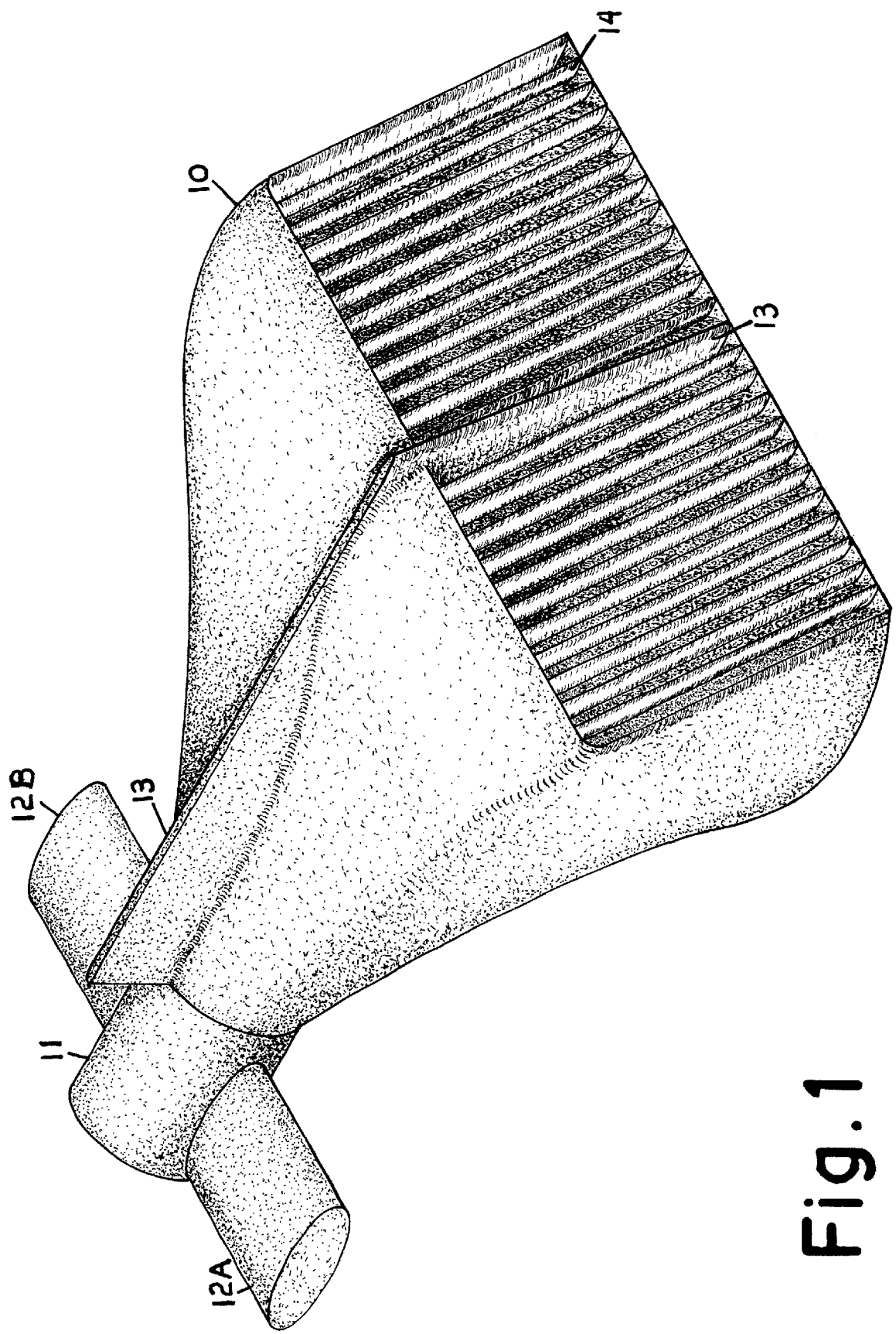
FIG. 1: is a perspective view.

FIG. 1: A perspective view of Applicant's Hydrokinetic Genich which details a composite scoop-like structure constructed of reinforced metal, concrete, or mixture thereof. The scoop-like composite hull 10 is hydrodynamically clean and functions similar to a hydrofoil or airfoil. Water current moves into the large orifice through a grill 14 which inhibits large sea life, foreign objects, and debris from entering the composite hull, The grill 14 is angled toward the rear to deflect large sea life, foreign objects, and debris, up and over the top or the scoop-like composite hull 10. As the water current moves over the top, sides, and bottom, symmetrical camber surfaces of the composite hull 10, the water velocity increases as it passes over the cambers to the lower pressure void created by the composite hull. The displaced water flowing over the composite hull 10 cambers has a longer distance to travel than the water current passing parallel to the structure, therefore, water velocity increases. The result of the increased water velocity over the hull will increase the water velocity and volume flow emerging from the turbine housing 11. The left generator housing 12A and the right generator housing 12B are symmetrical and produce very little drag. The generators 12A, 12B, are hermetically sealed to protect the generators. The turbine housing 11 is detachable from the composite hull 10 for ease of maintenance. The generator housings 12A, 12B, are also detachable from the turbine housing 11 for ease of maintenance. A vertical stabilizer petition 13 keeps the composite hull 10 directly in-line with the water current direction for maximum efficiency.

Figure 2:
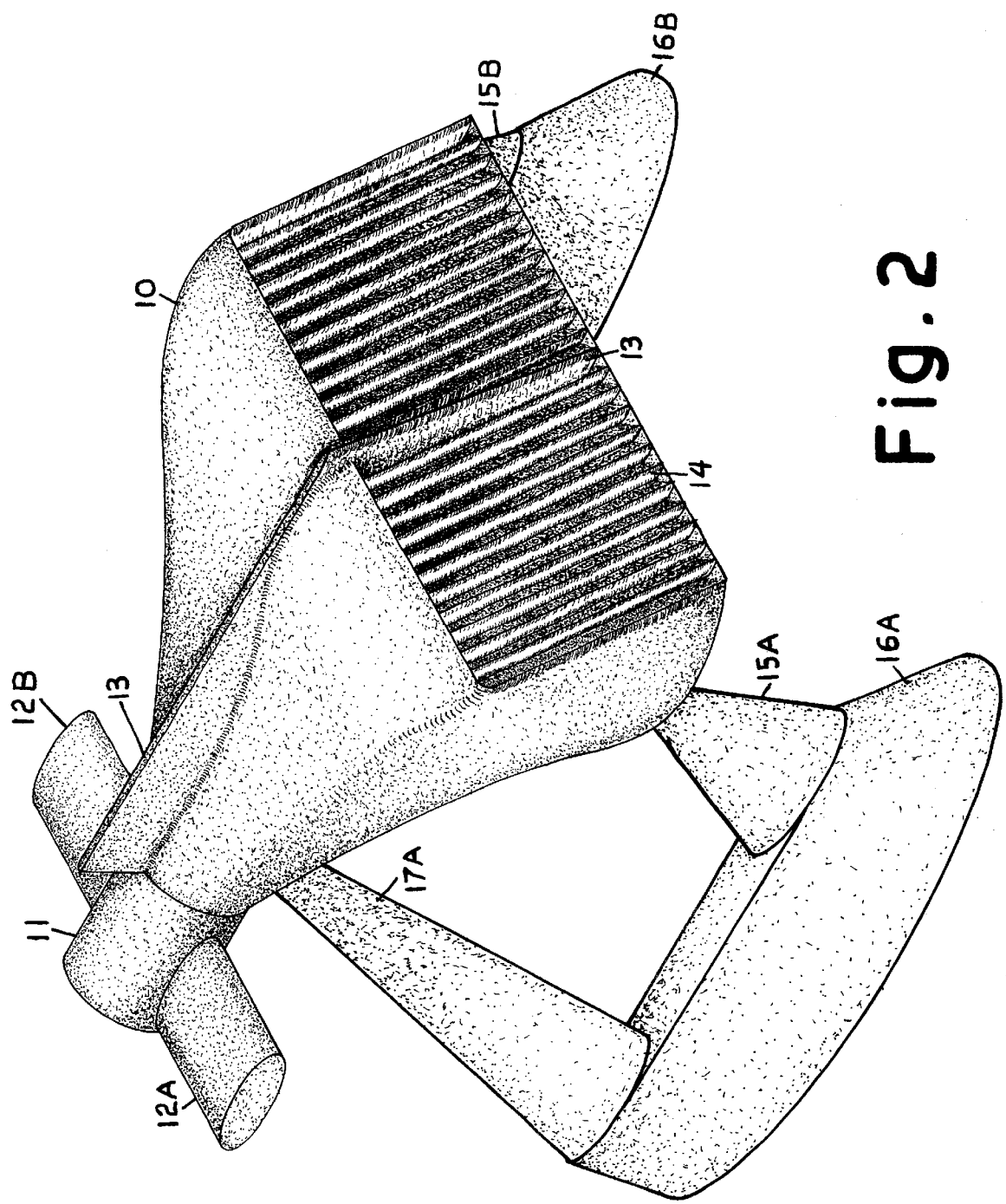
FIG. 2: is a perspective view.

FIG. 2: A perspective view of Applicant's Hydrokinetic Generator which details the scoop-like composite hull 10, attached to a left front leg 15A, a right front leg 15B, and a rear leg 17A, to a left front floodable anchor base 16A, and a right front floodable anchor base 16B. The floodable anchor bases 16A, 16B, help keep the structure afloat during transportation, and are flooded when setting the structure in place on the bottom or other medium. The vertical stabilizer petition 13 keeps the structure in-line with the water current direction. The legs 15A, 15B, 17A, keep the structure's hull 10 at a height necessary to avoid drag from the anchor medium, created by an uneven bottom, large rocks, or other debris which would inhibit the water current's velocity. Other versions of anchor bases not shown would connect the structure's hull 10 to the side of an underwater cliff or trench where the water may be to deep to use the anchor base as shown.

Figure 3:
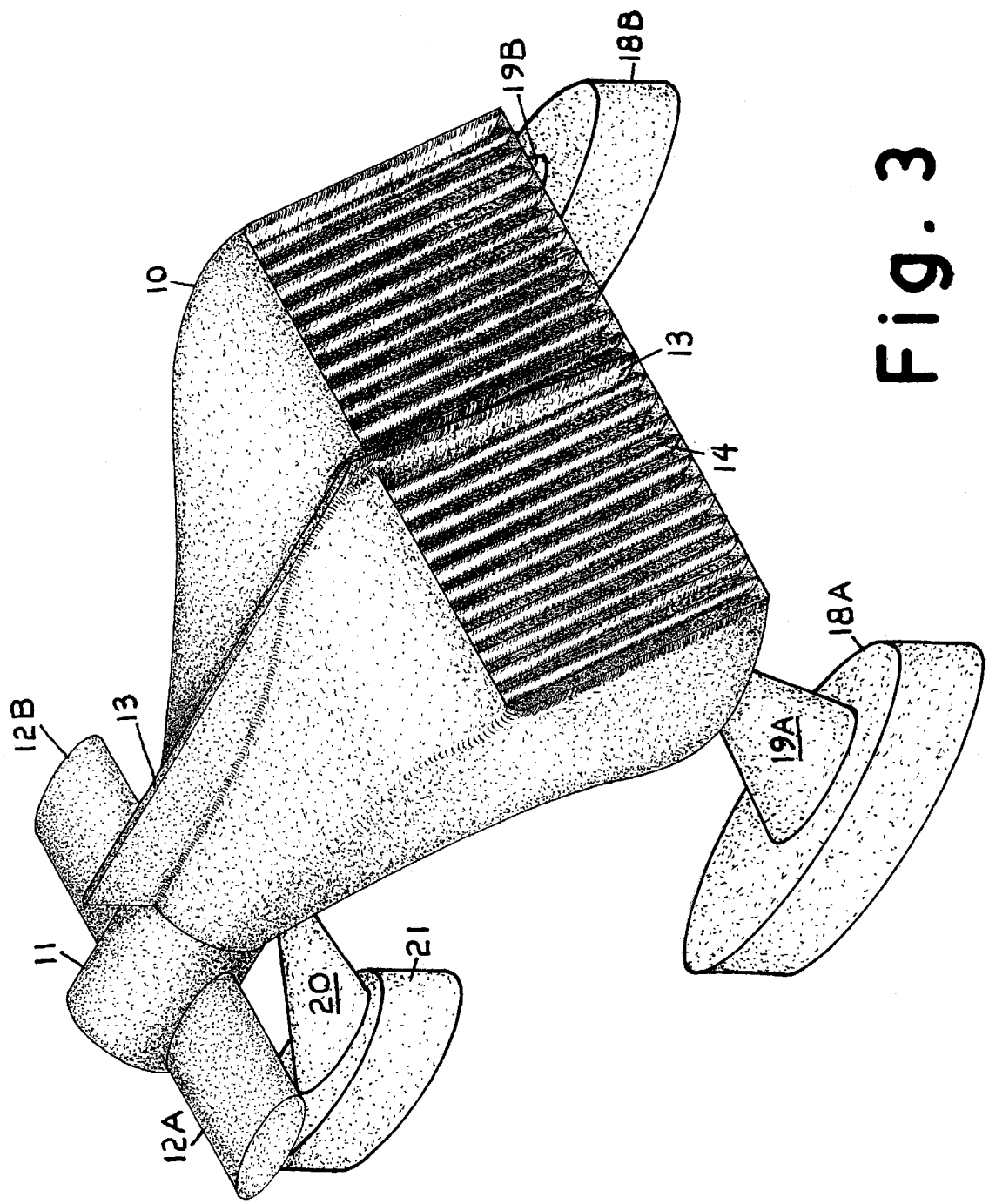
FIG. 3: is a perspective view.

FIG. 3: A perspective view of Applicant's hydrokinetic Generator which details the scoop-like composite hull 10, attached to a left front leg 19A, attached to a left front floodable anchor base 18A, a right front leg 19B, attached to a right front floodable anchor base 18B, and a rear leg 20, attached to a single rear floodable anchor base 21. The size of the anchor bases, is dependent on the velocity of the water current and the drag created by the size of the scoop-like composite hull 10. The structure has a left generator housing 12A and a right generator housing 12B which are both symmetrical to produce little drag. The generator housings are detachable from the turbine housing 11. The vertical stabilizer petition 13 keeps the structure in-line with the water current direction, and the grill 14 inhibits sea life, foreign objects, and debris from entering the large orifice.

Figure 4:
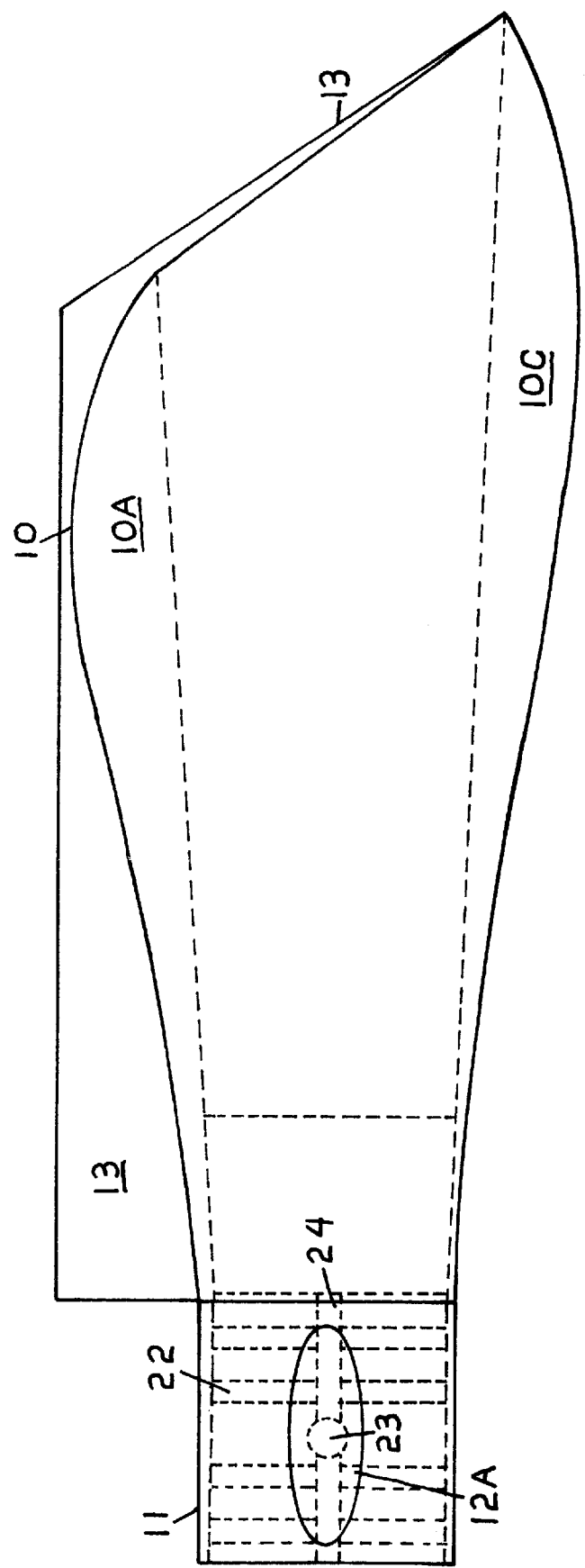
FIG. 4: is a side view.

FIG. 4: A side view of Applicant's Hydrokinetic Generator which details the components of the scoop-like composite hull 10, containing: a left top floodable chamber 10A; a bottom floodable chamber 10C; a vertical stabilizer petition 13, a turbine housing 11; a left generator housing 12A; a turbine 22; a turbine drive shaft 24; and a gear box 23. The hydrodynamically clean hull 10 functions similar to a hydrofoil or airfoil, whereby, water current flows into the orifice where water pressure increases as the volume reaches the turbine. Excess water is diverted over the top, sides, and bottom, symmetrical cambers on the outer hull 10. The velocity over the outer hull 10 increases to fill the void. As the turbine 22 rotates from internal water pressure on the blades, the outer water velocity increase will enhance the water flowing from the turbine housing 11 and will increase the efficiency of the turbine 22. The vertical stabilizer 13 keeps the structure in-line with the water current direction for maximum turbine 22 efficiency. The floodable chambers of the hull 10 and the floodable anchor bases increase the structure's buoyancy for transporting the structure.

Figure 5:
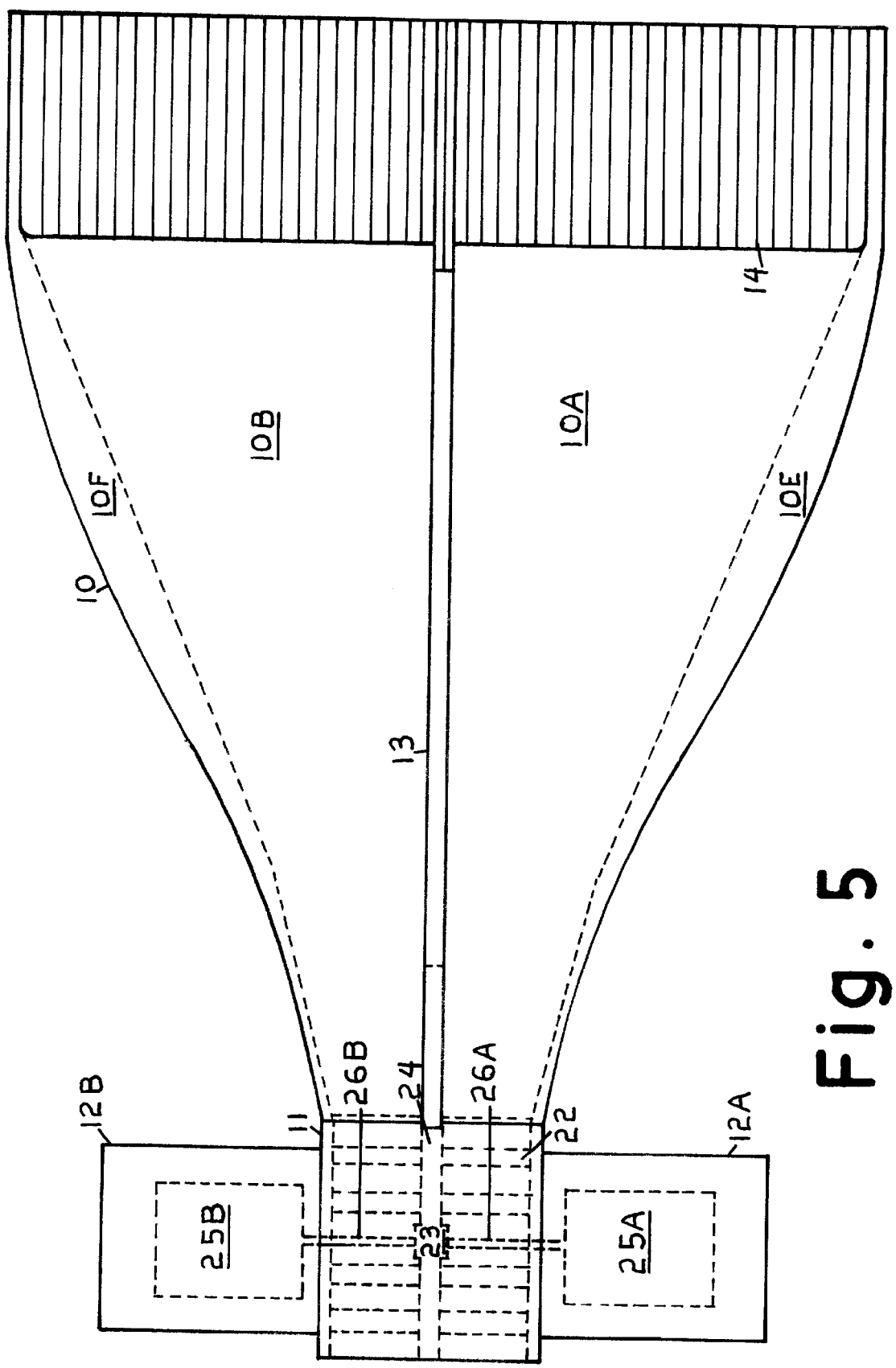
FIG. 5: is a top view.

FIG. 5: A top view of Applicant's Hydrokinetic Generator which details the components of the scoop-like composite hull 10, containing: a left top floodable chamber 10A; a right top floodable chamber 10B; a left side floodable chamber 10E; a right side floodable chamber 10F; a grill 14; a vertical stabilizer petition 13; a detachable turbine housing 11, which houses a turbine 22; a turbine drive shaft 24; a gear box 23; a left generator drive shaft 26A; a right generator drive shaft 26B; a left detachable generator housing 12A, containing a left generator 25A; a right detachable generator housing 12B, containing a right generator 25B. The view details the hydrodynamically clean scoop-like composite hull 10, where the water current enters the large orifice through a grill 14, and builds pressure which rotates the turbine 22. The water current flows over the outer hull cambers which increase the water current velocity when the water velocity rushes to fill the void created by the tapered body and the size of the structure. Where the outer increased water velocity merges with the turbine exhaust water, increases the flow from the turbine 22 for maximum efficiency. The water current is not affected by the minimal drag produced by the symmetrical shapes of the generator housings 12A, 12B. The efficiency of the turbine to generate mechanical energy for the generators will depend on; the water current velocity increase over the hull; the water volume and pressure entering the inner hull to rotate the turbine 22; the water current merger with the exhaust flow from the turbine 22, and; the load effect of the generators.

Figure 6:
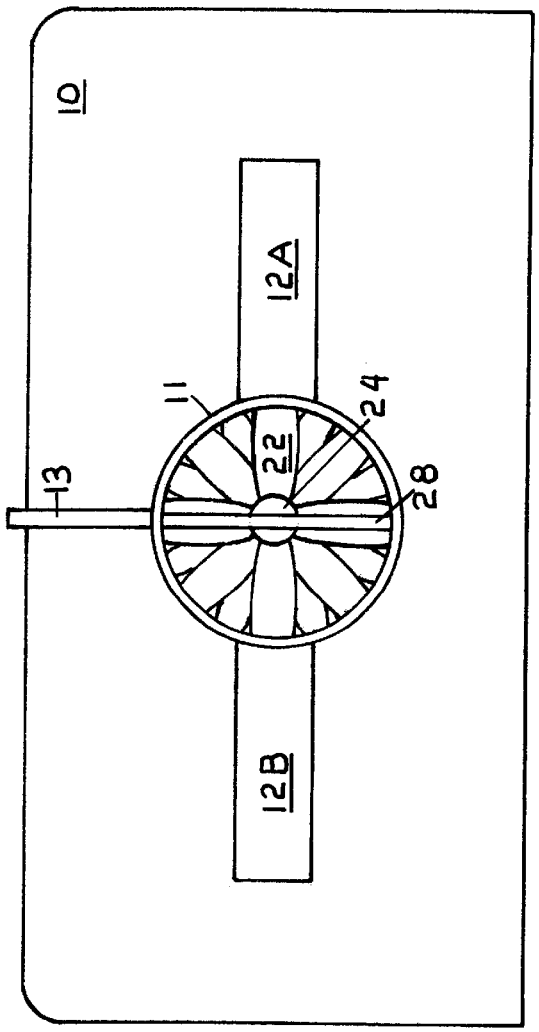
FIG. 6: is a rear view.

FIG. 6: A rear view of Applicant's Hydrokinetic Generator which details the rear of the composite outer hull 10; a vertical stabilizer petition 13; a detachable turbine housing 11, containing a turbine 22, a turbine drive shaft, and a verticle drive shaft support 28; a left symmetrically shaped generator housing 12A, and; a right symmetrically shaped generator housing 12B. The view further details the void created by the tapered body of the scoop-like composite hull 10 to the turbine housing 11. The amount of water current having to close the void will substantially increase the velocity when the water reaches the turbine housing 11 and merges with the turbine exhaust water flow velocity. This will enhance the efficiency of the turbine 22.

Figure 7:
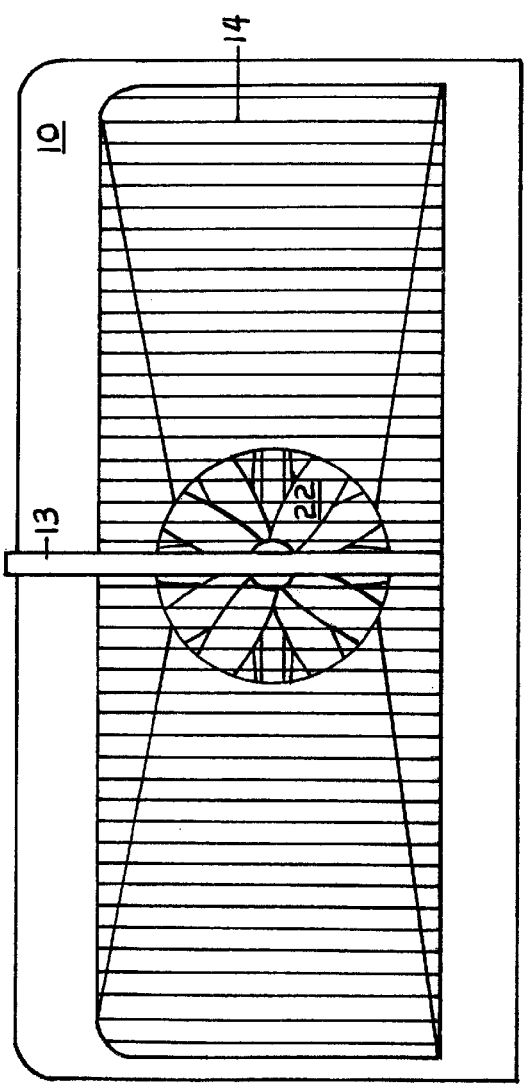
FIG. 7: is a front view.

FIG. 7: A front view of Applicant's Hydrokinetic Generator which details a scoop-like composite hull 10, with a vertical stabilizer petition 13 which adds verticle support and keeps the structure in-line with the water current direction; a grill 14, which inhibits sea life, foreign objects, and debris from entering the large orifice and is constructed from durable rigid material wherein each individual blade of the grill 14 is elliptically shaped and symmetrical to produce very little drag.

Figure 8:
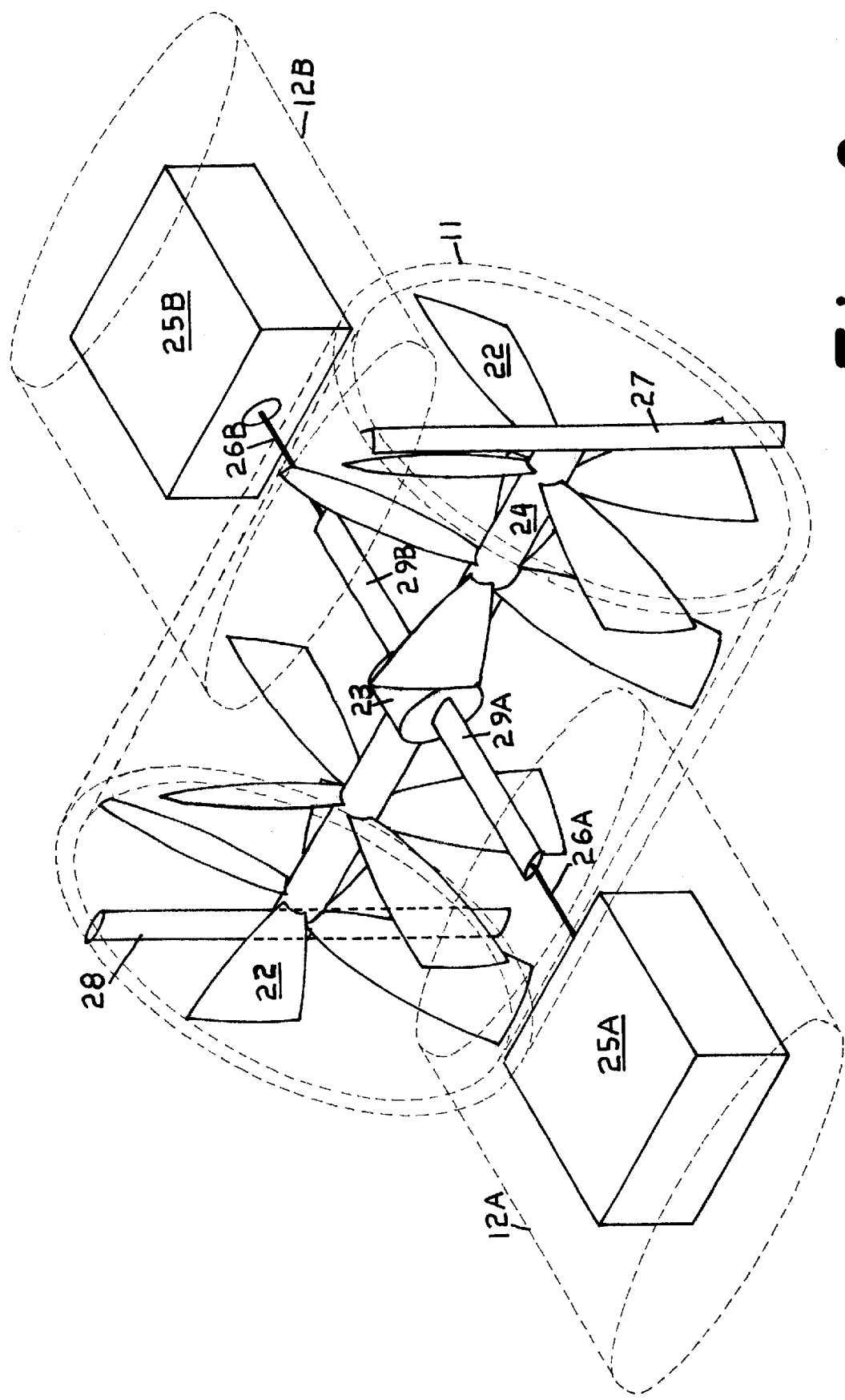
FIG. 8: is a perspective view.

FIG. 8: A. perspective view of Applicant's Hydrokinetic Generator which details the internal elements of the turbine housing 11, and the generator housings 12A, 12B. The turbine housing 11, contains: a turbine 22; a gear box 23; a turbine drive shaft 24; a front vertical turbine drive shaft support 27; a rear vertical turbine drive shaft support 28; a left generator drive shaft housing 29A; a right generator drive shaft housing 29B; a left generator housing 12A, containing a left generator 25A, and a left generator drive shaft 26A; a right generator housing 12B, containing a right generator 25B, and a right generator drive shaft 26B. The turbine 22 shown contains four banks of turbine blades, however, there may be one or more banks of turbine blades depending on the generator, the load produced by the generator, and the velocity of the water current. There may be one or more generators and one or more turbines per unit, also depending on the particular need.

Figure 9:
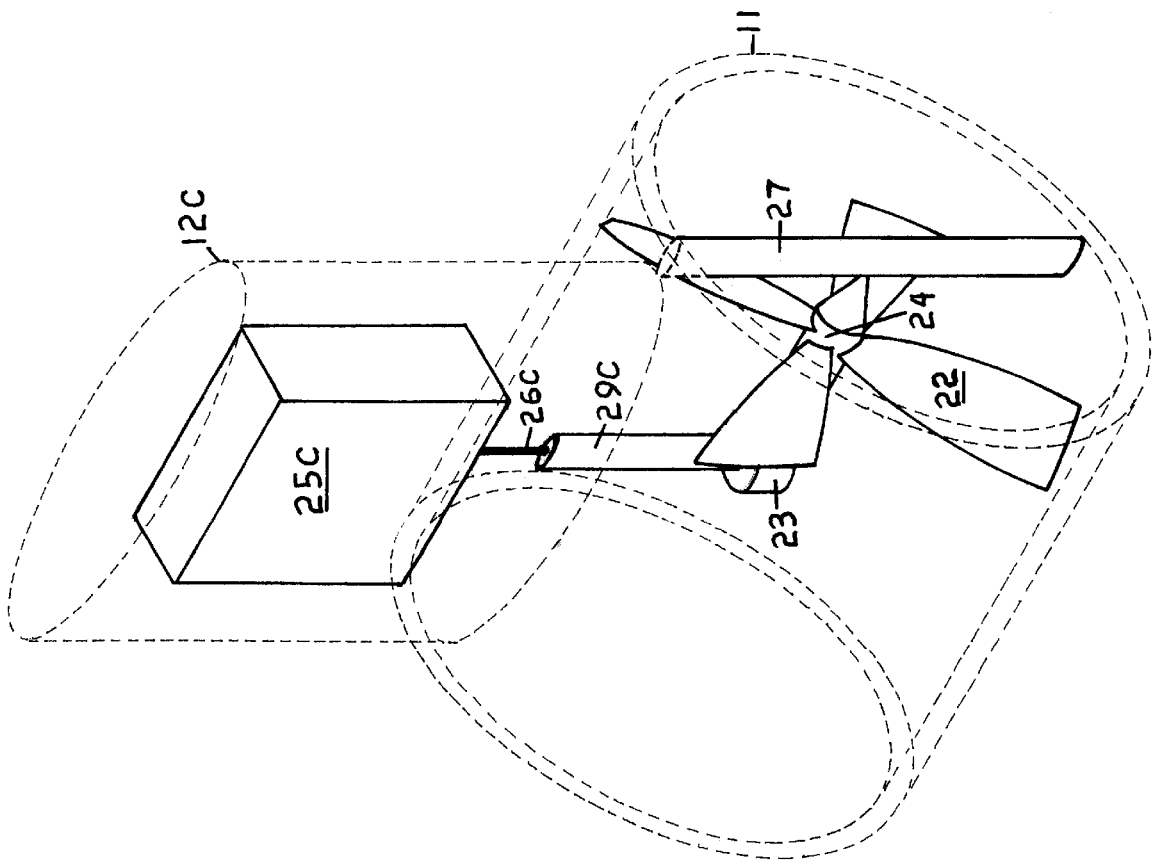
FIG. 9: is a perspective view.

FIG. 9: A perspective view of Applicant's Hydrokinetic Generator which details the internal elements of a single turbine housing 11, containing a single turbine 22 comprised of one bank of turbine blades; a gear box 23; a turbine drive shaft 24; a front-vertical turbine drive shaft support 27; a generator drive shaft housing 29C; a generator drive shaft 26C; a top mounted generator housing 12C, containing a generator 25C. The single bank turbine would be used where a less demanding power usage is needed. The unit could be small enough to efficiently produce power for a single remote household nearby to a flowing stream, river, or ocean water current.

ALTERNATIVE EMBODIMENTS

1. There can be additional configurations of Applicant's Hydrokinetic Generator, such as for recreational usage, wherein, the scoop-like structure would comprise: a collapsible funnel-shaped scoop that is submerged or semi-submerged in a stream or river. The turbine and generator would be combined in a single known configuration where a sealed generator has a propeller attached to its shaft. The generator would be secured in a housing attachable to the collapsible scoop-like structure. The structure would require an anchor base, which could include a rope or cable tied to rocks, stakes, trees, or other medium. A structure as this would be relatively inexpensive to construct and cost effective for the consumer. The structure could power lights, stoves, recharge batteries, or any other recreational uses.

2. There can be alternative construction materials for Applicant's Hydrokinetic Generator, such as composite fiber materials such as fiberglass, nylon, kevlar. There can be combinations of materials such as, composite fiber mixed within a concrete mixture or metal covered in composite fiber material. The factors that will dictate which construction material, will consist of; the type of water, the strength of the current, the corrosion effect of the environment, and the effectiveness of the material to withstand long periods submerged.

What is claimed is:

1. A submersible scoop-like composite structure improved means for generating hydroelectric power, comprising:

a. a scoop-like composite structure with a hollow, tapered, inner chamber means to funnel a volume of moving water through at least one turbine means, to provide rotational energy controllably coupled to at least one generator means to generate electrical power;

b. said hollow, tapered, inner chamber means with a predetermined orifice, substantial to funnel a volume of moving water, to rotate at least one said turbine means coupled to at least one said generator means;

c. said predetermined orifice with a protective grill means to inhibit objects from entering the predetermined orifice;

d. said scoop-like composite structure with a hydrodynamically clean tapered, outer hull with a cambered surface means to increase the velocity of moving water over the tapered outer hull;

e. said turbine means housed in a protective tube, contiguous and aft of said tapered outer hull;

f. said generator means housed in a protective shell, contiguous to said turbine protective tube;

g. said scoop-like composite structure having an attachment means to secure the scoop-like composite structure to a submerged fixed medium;

h. said scoop-like composite structure constructed of a rigid material, or rigid combination of material selected from the group consisting of: reinforced metal, concrete, composite fiber, or a combination thereof.

2. A scoop-like composite structure of claim 1, wherein said composite structure has a stabilizer means to stabilize the composite structure in moving water.

3. A scoop-like composite structure of claim 1, wherein said turbine means and said generator means are combined in a known single unit configuration.

4. A scoop-like composite structure of claim 1, wherein said scoop-like structure is semi-submersible.

5. A scoop-like composite structure of claim 1, wherein said scoop-like structure hull is collapsible.

* * * * *